(12) United States Patent
Kunisue et al.

(10) Patent No.: US 9,117,292 B2
(45) Date of Patent: Aug. 25, 2015

(54) PICTURE PROCESSING DEVICE

(71) Applicant: PANASONIC CORPORATION, Osaka (JP)

(72) Inventors: Katsuji Kunisue, Osaka (JP); Hisako Chiaki, Nara (JP); Yuki Kishida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/220,039

(22) Filed: Mar. 19, 2014

(65) Prior Publication Data

US 2014/0286571 A1 Sep. 25, 2014

(30) Foreign Application Priority Data

Mar. 21, 2013 (JP) .................................. 2013-057609
Feb. 21, 2014 (JP) .................................. 2014-031334

(51) Int. Cl.
  *G06K 9/00* (2006.01)
  *G06T 5/40* (2006.01)
  *G06T 5/00* (2006.01)

(52) U.S. Cl.
  CPC . *G06T 5/40* (2013.01); *G06T 5/008* (2013.01); *G06T 2207/10016* (2013.01); *G06T 2207/20021* (2013.01); *G06T 2207/20076* (2013.01)

(58) Field of Classification Search
  CPC .......... G06T 5/40; G06T 5/008; H04N 9/643; H04N 1/628; H04N 3/27; H04N 3/2335; H04N 3/26; H04N 21/42638; H04N 21/4382; H04N 5/144; H04N 5/211; H04N 5/4401; H04N 5/4446; H04N 5/46; H04N 5/91
  USPC ......................................................... 382/168
  See application file for complete search history.

(56) References Cited

U.S. PATENT DOCUMENTS 5,058,179 A * 10/1991 Denker et al. ................. 382/158
2005/0117813 A1 * 6/2005 Nishida et al. ................ 382/275
2006/0044424 A1 * 3/2006 Shirai et al. ................... 348/241

(Continued)

FOREIGN PATENT DOCUMENTS

JP 2002-366121 A 12/2002
JP 2004-282661 A 10/2004

(Continued)

*Primary Examiner* — Ali Bayat
(74) *Attorney, Agent, or Firm* — McDermott Will & Emery LLP

(57) ABSTRACT

The present technique includes: an area-characteristic detector configured to calculate a maximum value, an average value, and a minimum value of signal levels of pixels around a certain pixel; a first gain creating part configured to calculate a first calculation value for the certain pixel; a second gain creating part configured to calculate a second calculation value for the certain pixel; and an adjustment part configured; to perform enhancement by multiplying the difference between the average value and the signal level of the certain pixel by the first calculation value when the signal level of the certain pixel is equal to or higher than the average value, and to perform enhancement by multiplying the difference between the average value and the signal level of the certain pixel by the second calculation value when the signal level of the certain pixel is lower than the average value.

8 Claims, 20 Drawing Sheets

(56) References Cited

U.S. PATENT DOCUMENTS

2006/0125771 A1* 6/2006 Inuzuka et al. ............... 345/102
2008/0225176 A1* 9/2008 Selby et al. .................. 348/572

FOREIGN PATENT DOCUMENTS

| JP | 2008-271316 A | 11/2008 |
|---|---|---|
| JP | 2010-161456 A | 7/2010 |

* cited by examiner

PICTURE PROCESSING DEVICE

RELATED APPLICATIONS

This application claim the benefit of Japanese Application No. 2013-057609, filed on Mar. 21, 2013 and Japanese Application No. 2014-031334, filed Feb. 21, 2014, the disclosures of which Applications are incorporated by reference herein.

BACKGROUND OF THE INVENTION

1. Field of the Invention

The present technique relates to picture processing devices for processing pictures.

2. Description of the Related Art

As a picture processing device for enhancing contrasts in pictures with lower contrasts, there is a picture processing device described in Unexamined Japanese Patent Publication No. 2002-366121.

The picture processing device described in Unexamined Japanese Patent Publication No. 2002-366121 is configured to detect signal levels (maximum values, minimum values, APLs (Average Picture Levels) and the like) which are indicative of characteristics of picture signals in each unit field period or in each unit frame period, from brightness signal components of input picture signals and, further, is configured to create tone correction data according to the results of detections of the characteristics of the picture signals. Based on the created tone correction data, the picture processing device performs signal processing for enhancing the contrasts of the input picture signals.

Through the aforementioned operations, tone enhancement is performed for only signals with levels equal to or higher than a tone correction start point, while the tone correction is not performed for signal levels lower than the tone correction start point, in each unit field period or each unit frame period. This enables tone corrections for input picture signals, without inducing black floating, and without enhancing noise feelings in dark portions.

SUMMARY OF THE INVENTION

A picture processing device according to the present technique includes: an area-characteristic detector configured to calculate a maximum value, an average value, and a minimum value of signal levels of pixels around a certain pixel to be subjected to a correction in an input picture signal; a first gain creating part configured to calculate a first calculation value for the certain pixel, from a value of difference between the maximum value and the average value; a second gain creating part configured to calculate a second calculation value for the certain pixel, from a value of difference between the minimum value and the average value; and a signal amplitude adjustment part; the signal amplitude adjustment part being configured to perform enhancement by multiplying the difference between the average value and the signal level of the certain pixel by the first calculation value when the signal level of the certain pixel is equal to or higher than the average value, and the signal amplitude adjustment part being configured to perform enhancement by multiplying the difference between the average value and the signal level of the certain pixel by the second calculation value when the signal level of the certain pixel is lower than the average value.

DETAILED DESCRIPTION OF THE PREFERRED EMBODIMENTS

Hereinafter, a picture processing device according to an embodiment of the present technique will be described, with reference to the drawings. However, unnecessarily-detailed descriptions may be omitted, in some cases. For example, matters which have been already well known may not be described in detail, and structures which are substantially the same may not be described redundantly, in some cases. This is for preventing the following descriptions from being unnecessarily redundant, in order to allow those skilled in the art to easily understand them.

Further, the present inventors provide the accompanying drawings and the following descriptions for allowing those skilled in the art to sufficiently understand the present technique, and they are not intended to restrict the subjects defined in the claims.

Figure 1:
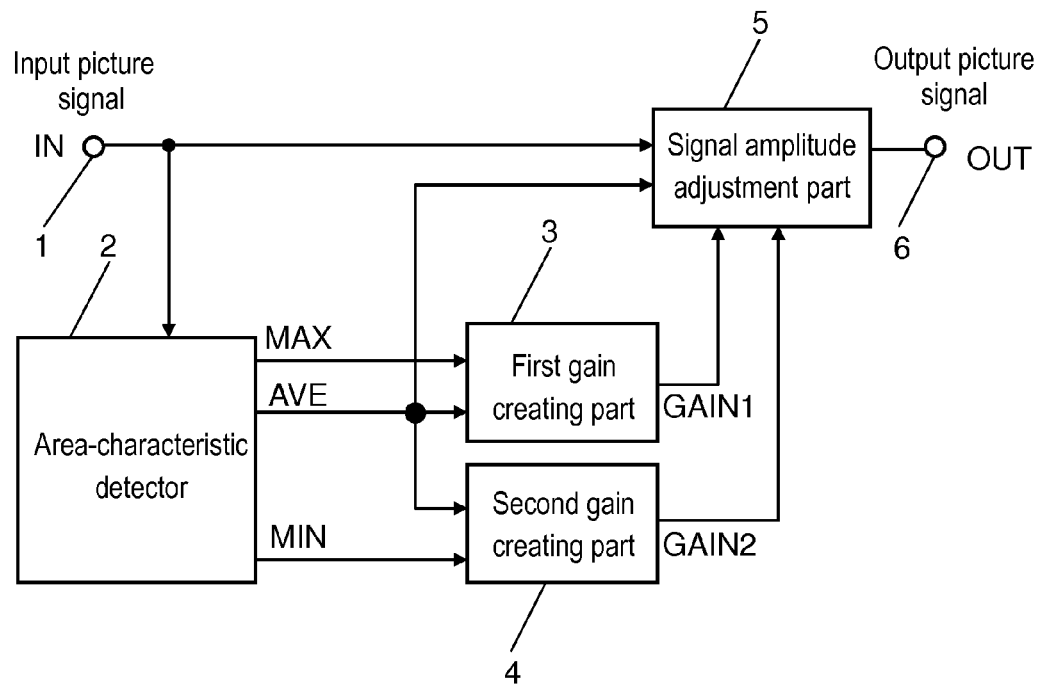
FIG. 1 is a block diagram illustrating an example of a picture processing device according to an embodiment of the present technique.
Figure 2:
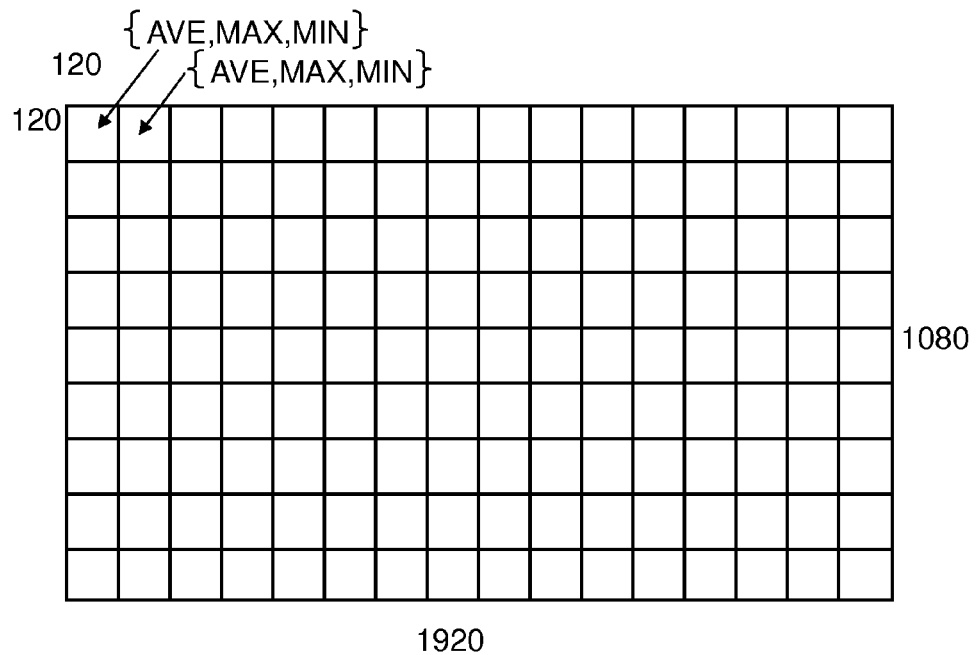
FIG. 2 is an explanation view illustrating an example of area divisions, in the picture processing device according to the present embodiment.

FIG. 1 is a block diagram illustrating an example of the picture processing device according to an embodiment of the present technique. FIG. 2 is an explanation view illustrating an example of area divisions, in the picture processing device according to the present embodiment. Further, FIG. 2 is a view illustrating an example where an input picture has 1920 horizontal pixels and 1080 vertical lines, illustrating an example where the area is divided into blocks with 120 horizontal pixels and 120 vertical lines.

As illustrated in FIG. 1, the picture processing device according to the present embodiment includes input part 1, area-characteristic detector 2, first gain creating part 3, second gain creating part 4, signal amplitude adjustment part 5, and output part 6.

An input picture signal IN is supplied to input part 1, and further, is inputted to area-characteristic detector 2 and signal amplitude adjustment part 5. Area-characteristic detector 2 calculates a maximum value, an average value, and a minimum value of the signal levels of pixels around a certain pixel to be subjected to the correction, in the input picture signal. Namely, area-characteristic detector 2 divides the inputted picture into areas and detects the characteristic values (the maximum value, the average value and the minimum value) in each area, as illustrated in FIG. 2. Area-characteristic detector 2 calculates an average value AVE, a maximum value MAX, and a minimum value MIN of the brightness levels in 120 horizontal pixels and 120 vertical lines in each area. Thereafter, the average value AVE and the maximum value MAX are inputted to first gain creating part 3, and further, the average value AVE and the minimum value MIN are inputted to second gain creating part 4.

Figure 3:
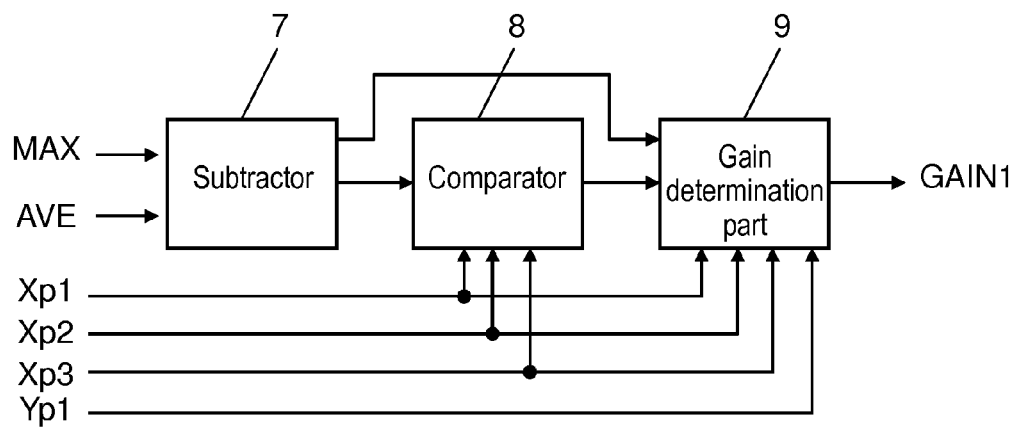
FIG. 3 is a block diagram illustrating an example of the structure of a first gain creating part, in the picture processing device according to the present embodiment.

FIG. 3 is a block diagram illustrating an example of the structure of the first gain creating part, in the picture processing device according to the present embodiment.

As illustrated in FIG. 3, first gain creating part 3 includes subtractor 7, comparator 8, and gain determination part 9. Subtractor 7 performs a subtraction on the maximum value MAX and the average value AVE which have been inputted thereto, and the value of the difference MAX−AVE between the maximum value MAX and the average value AVE is inputted to comparator 8. Besides, set parameters Xp1, Xp2, Xp3 and Yp1 are inputted to comparator 8.

Figure 4:
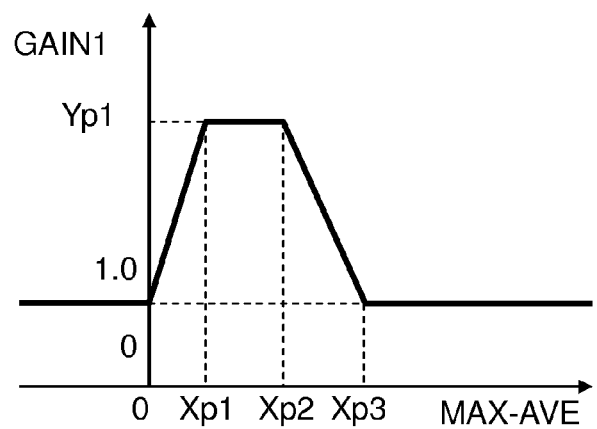
FIG. 4 is a view illustrating an example of a first gain creation characteristic, in the picture processing device according to the present embodiment.

FIG. 4 is a view illustrating an example of a first gain creation characteristic, which is determined by comparator 8 and gain determination part 9, in the picture processing device according to the present embodiment. Referring to FIG. 4, the horizontal axis represents the value of the difference MAX−AVE between the maximum value MAX and the average value AVE, the value of the difference MAX−AVE being calculated by subtractor 7, while the vertical axis represents a first gain GAIN1 which is outputted from first gain creating part 3. Comparator 8 makes comparisons between the respective parameters and the value of the difference MAX−AVE between the maximum value MAX and the average value AVE to determine which area in the polyline in FIG. 4 the value exists in. Thereafter, gain determination part 9 calculates a gain output as a first multiplication value, according to the following equations, depending on the area determined by comparator 8.

In the case of $Xp1 > (MAX-AVE) \geq 0$ $$GAIN1 = (Yp1-1.0)/Xp1 \times (MAX-AVE) + 1.0 \quad (1)$$

In the case of $Xp2 > (MAX-AVE) \geq Xp1$ $$GAIN1 = Yp1 \quad (2)$$

In the case of $Xp3 > (MAX-AVE) \geq Xp2$ $$GAIN1 = (1.0 - Yp1)/(Xp3 - Xp2) \times (MAX-AVE-Xp2) + Yp1 \quad (3)$$

In the case of $(MAX-AVE) \geq Xp3$ $$GAIN1 = 1.0 \quad (4)$$

Figure 5:
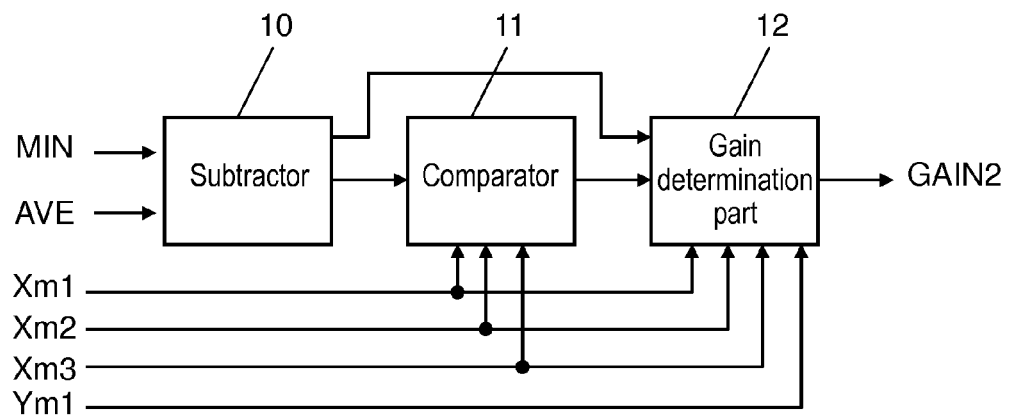
FIG. 5 is a block diagram illustrating an example of the structure of a second gain creating part, in the picture processing device according to the present embodiment.

Also, calculations are performed through the same processing, for a second gain GAIN2 which is outputted from second gain creating part 4. FIG. 5 is a block diagram illustrating an example of the structure of the second gain creating part, in the picture processing device according to the present embodiment.

As illustrated in FIG. 5, second gain creating part 4 includes subtractor 10, comparator 11, and gain determination part 12. Subtractor 10 performs a subtraction on the minimum value MIN and the average value AVE which have been inputted thereto, and the value of the difference AVE–MIN between the minimum value MIN and the average value AVE is inputted to comparator 11. Besides, set parameters Xm1, Xm2, Xm3 and Ym1 are inputted to comparator 11.

Figure 6:
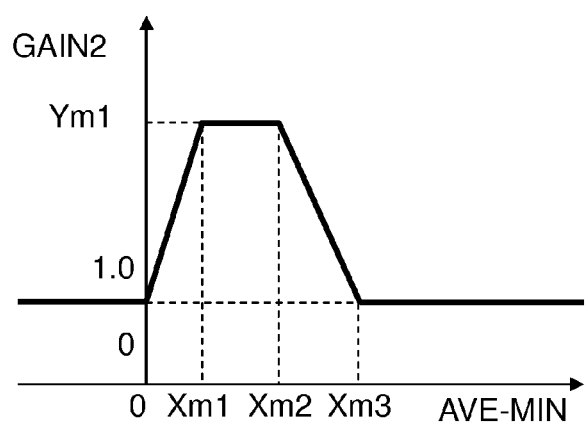
FIG. 6 is a view illustrating an example of a second gain creation characteristic, in the picture processing device according to the present embodiment.

FIG. 6 is a view illustrating an example of a second gain creation characteristic, which is determined by comparator 11 and gain determination part 12, in the picture processing device according to the present embodiment. Referring to FIG. 6, the horizontal axis represents the value of the difference AVE—MIN between the minimum value MIN and the average value AVE, the value of the difference AVE–MIN being calculated by subtractor 7, while the vertical axis represents a second gain GAIN2 which is outputted from second gain creating part 4. Comparator 11 makes comparisons between the respective parameters and the value of the difference AVE–MIN between the minimum value MIN and the average value AVE to determine which area in the polyline in FIG. 6 the value exists in. Thereafter, gain determination part 12 calculates a gain output as a second multiplication value, according to the following equations, depending on the area determined by comparator 11.

In the case of $Xm1 > (AVE-MIN) \geq 0$ $$GAIN2 = (Ym1-1.0)/Xm1 \times (AVE-MIN) + 1.0 \quad (1)$$

In the case of $Xm2 > (AVE-MIN) \geq Xm1$ $$GAIN2 = Ym1 \quad (2)$$

In the case of $Xm3 > (AVE-MIN) \geq Xm2$ $$GAIN2 = (1.0 - Ym1)/(Xm3 - Xm2) \times (AVE-MIN-Xm2) + Ym1 \quad (3)$$

In the case of $(AVE-MIN) \geq Xm3$ $$GAIN2 = 1.0 \quad (4)$$

The aforementioned calculations are performed for each area, and as illustrated in FIG. 1, the first gain GAIN1 and the second gain GAIN2 are inputted to signal amplitude adjustment part 5. An input picture signal IN, the average value AVE detected by area-characteristic detector 2, the first gain GAIN1 and the second gain GAIN2 which have been determined through the aforementioned calculations are inputted to signal amplitude adjustment part 5. In this case, for each pixel in the input picture signal IN inputted thereto, the input picture signal IN is compared with the average value of the area containing the pixel. As expressed by the following equations, an output picture signal OUT is provided, by performing a calculation for enhancing the difference between the input picture signal IN and the average value AVE by the first gain GAIN1 in cases where the input picture signal IN is equal to or larger than the average value AVE, and by performing a calculation for enhancing the difference between the input picture signal IN and the average value AVE by the second gain GAIN2, in cases where the input picture signal IN is smaller than the average value AVE.

In the case of $IN \geq AVE$, $OUT = GAIN1 \times (IN-AVE) + AVE$ (1)

In the case of $IN < AVE$, $OUT = GAIN2 \times (IN-AVE) + AVE$ (2)

Hereinafter, there will be described effects of the contrast enhancement through the aforementioned processing.

Figure 7:
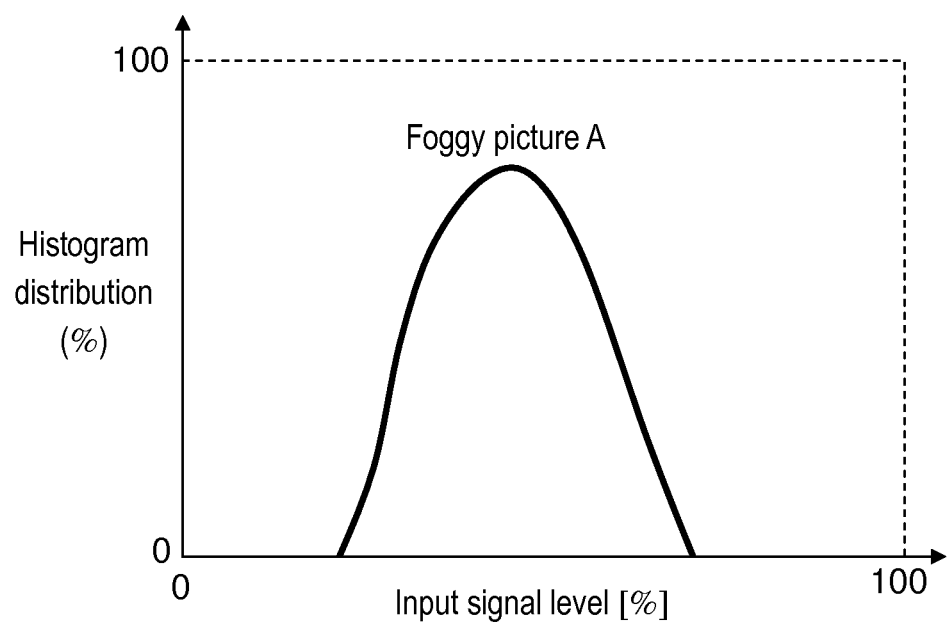
FIG. 7 is a view illustrating an example of a histogram distribution, in a unit field period or a unit frame period, in a case of a foggy picture A.

FIG. 7 is a view illustrating an example of a histogram distribution, in a unit field period or a unit frame period, in a case of a foggy picture A. Further, FIGS. 8A to 8D, FIGS. 9A to 9D, FIGS. 10A to 10D and FIGS. 11A to 11D are views illustrating examples of histogram distributions in respective areas "a", "b", "c" and "d", characteristics of the gain GAIN1 and the gain GAIN2 which are created by the first gain creating part and the second gain creating part, and histogram distributions of an output picture, in the same frame in the foggy picture A.

Figure 8A:
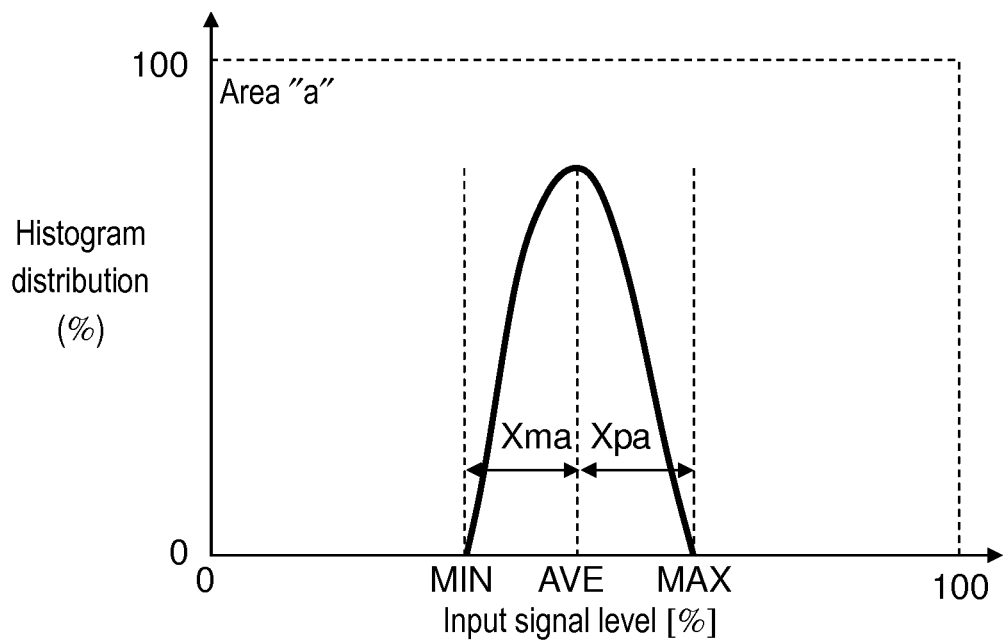
FIG. 8A is a view illustrating an example of a histogram distribution in an area "a", in the same frame in the foggy picture A.
Figure 8B:
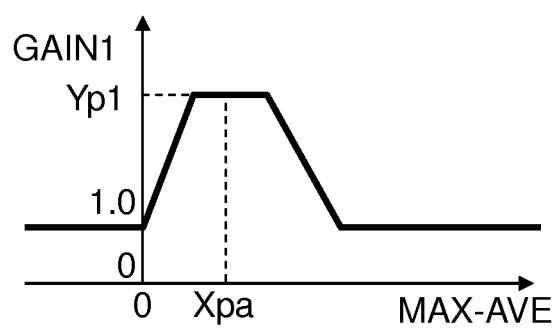
FIG. 8B is a view illustrating an example of a characteristic of a gain GAIN1 which is created by the first gain creating part, for the area "a"
Figure 8C:
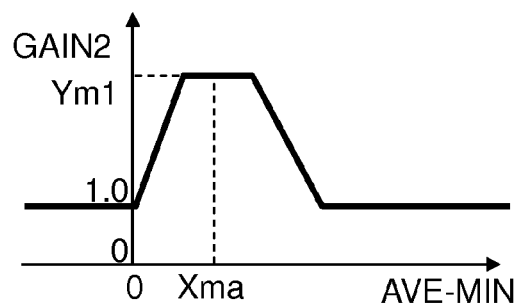
FIG. 8C is a view illustrating an example of a characteristic of a gain GAIN2 which is created by the second gain creating part, for the area "a"
Figure 8D:
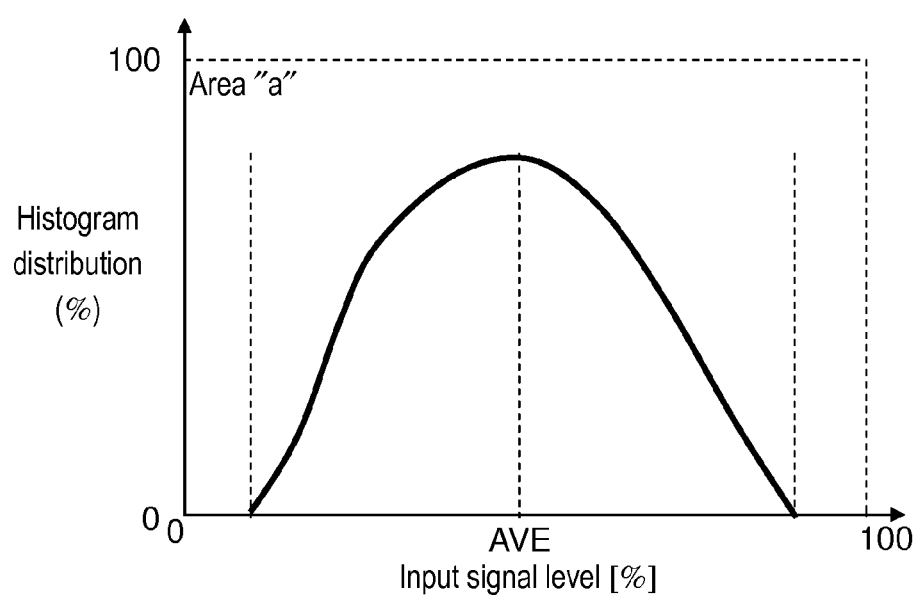
FIG. 8D is a view illustrating an example of a histogram distribution of an output picture, for the area "a"

In the case of the area "a" illustrated in FIG. 8A, the maximum value MAX, the minimum value MIN and the average value AVE are represented by dotted lines illustrated in the figure, and the value of the difference MAX–AVE between the maximum value and the average value is assumed to be Xpa, and the value of the difference AVE–MIN between the minimum value and the average value is assumed to be Xma. In this case, regarding the gain GAIN1 and the gain GAIN2 which are created by first gain creating part 3 and second gain creating part 4, the first gain is Yp1, and the second gain is Ym1, as illustrated in FIGS. 8B and 8C. Signal amplitude adjustment part 5 performs the aforementioned calculations, which results in provision of an output picture signal having a histogram distribution with an enhanced contrast, as illustrated in FIG. 8D.

Figure 9A:
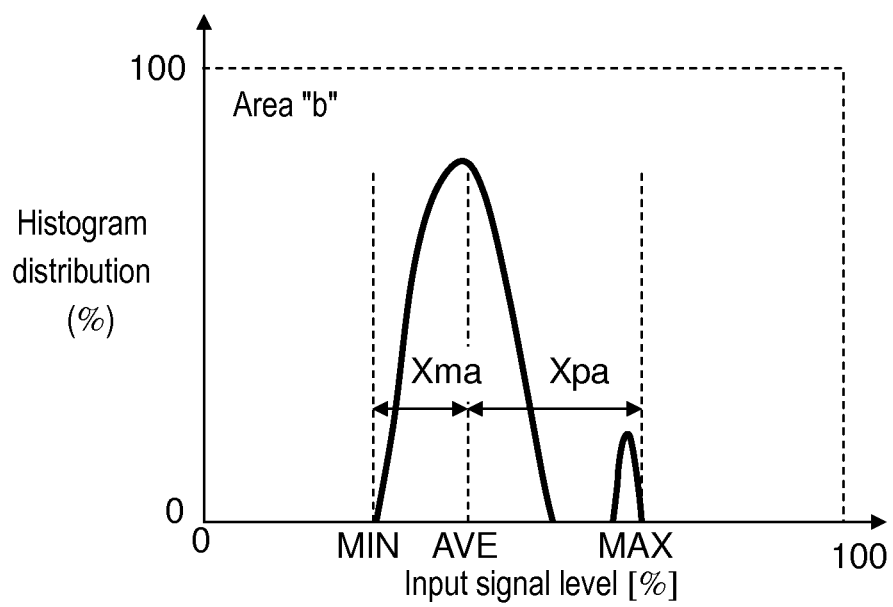
FIG. 9A is a view illustrating an example of a histogram distribution in an area "b", in the same frame in the foggy picture A.

In the case of the area "b" illustrated in FIG. 9A, this indicates that the picture has a lower contrast, but there exists a pixel with higher brightness and with a higher contrast within the area, which indicates that, if the contrast is further enhanced, this will degrade the picture quality due to the excessively-higher contrast feeling.

Figure 9B:
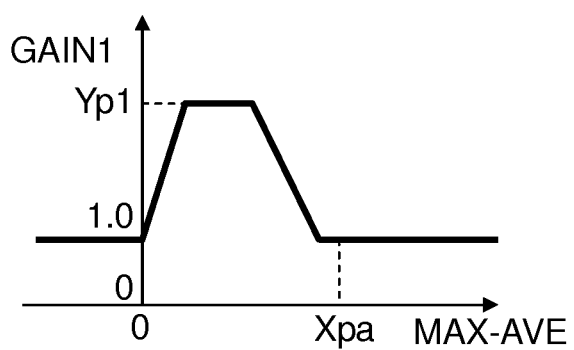
FIG. 9B is a view illustrating an example of a characteristic of the gain GAIN1 which is created by the first gain creating part, for the area "b"
Figure 9C:
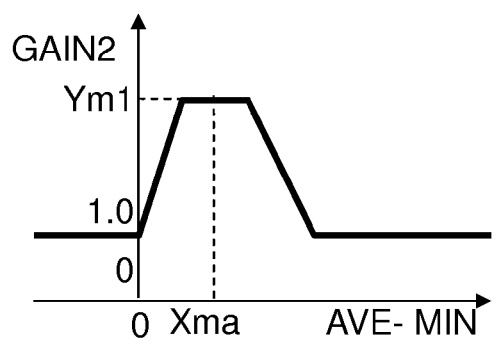
FIG. 9C is a view illustrating an example of a characteristic of the gain GAIN2 which is created by the second gain creating part, for the area "b"
Figure 9D:
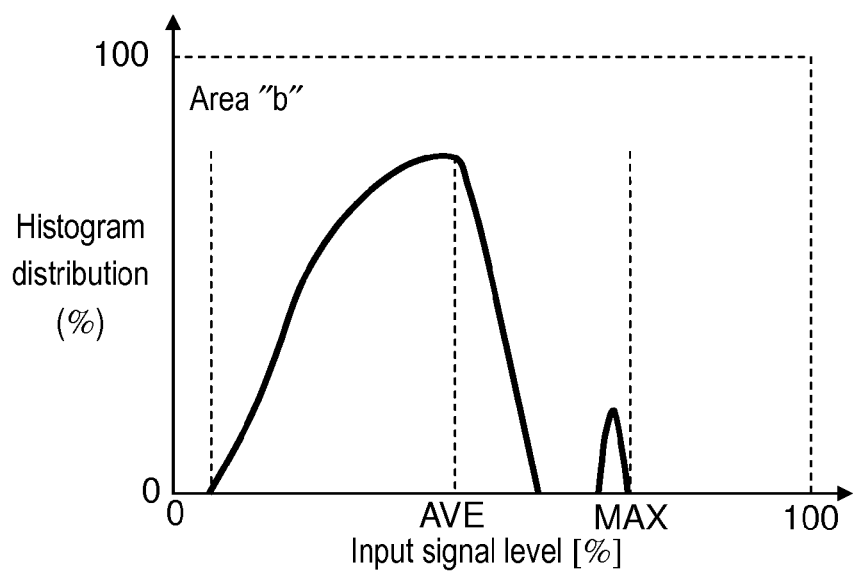
FIG. 9D is a view illustrating an example of a histogram distribution of an output picture, for the area "b"

The maximum value MAX, the minimum value MIN and the average value AVE are represented by dotted lines illustrated in the figure, and the value of the difference MAX–AVE between the maximum value and the average value is assumed to be Xpa, and the value of the difference AVE–MIN between the minimum value and the average value is assumed to be Xma. In this case, regarding the gain GAIN1 and the gain GAIN2 which are created by the first gain creating part and the second gain creating part, the first gain is 1.0, and the second gain is Ym1, as illustrated in FIGS. 9B and 9C. Signal amplitude adjustment part 5 performs the aforementioned calculations, but the pixels with brightness levels equal to or higher than the average value AVE are maintained, in brightness level, since the first gain is 1.0. This results in provision of an output picture signal having a histogram distribution with an enhanced contrast for levels lower than the average value AVE, as illustrated in FIG. 9D.

Figure 10A:
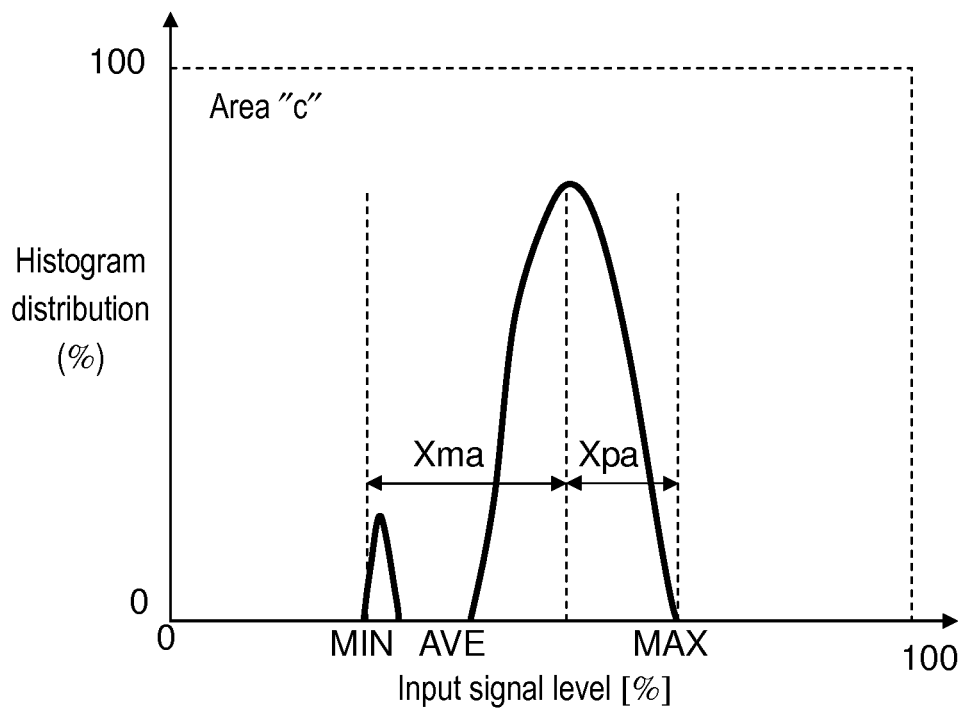
FIG. 10A is a view illustrating an example of a histogram distribution in an area "c", in the same frame in the foggy picture A.

In the case of the area "c" illustrated in FIG. 10A, it is in an opposite state from that of FIG. 9A. This indicates that the picture has a lower contrast, but there exists a pixel with lower brightness and with a higher contrast within the area, which indicates that, if the contrast is further enhanced, this will degrade the picture quality due to the excessively-higher contrast feeling.

Figure 10B:
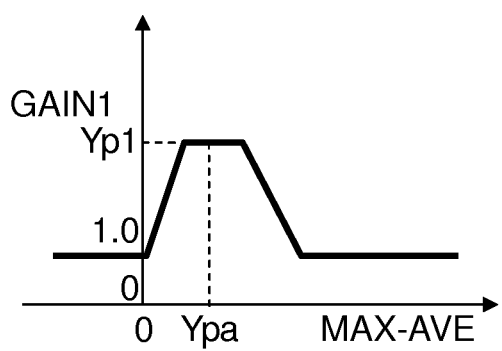
FIG. 10B is a view illustrating an example of a characteristic of the gain GAIN1 which is created by the first gain creating part, for the area "c"
Figure 10C:
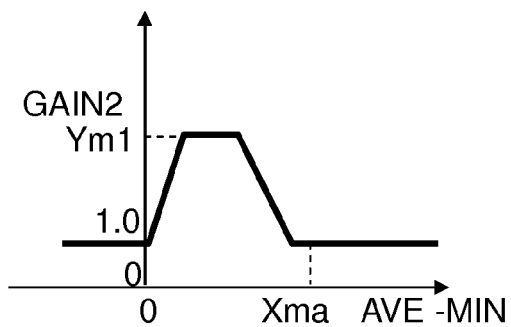
FIG. 10C is a view illustrating an example of a characteristic of the gain GAIN2 which is created by the second gain creating part, for the area "c"
Figure 10D:
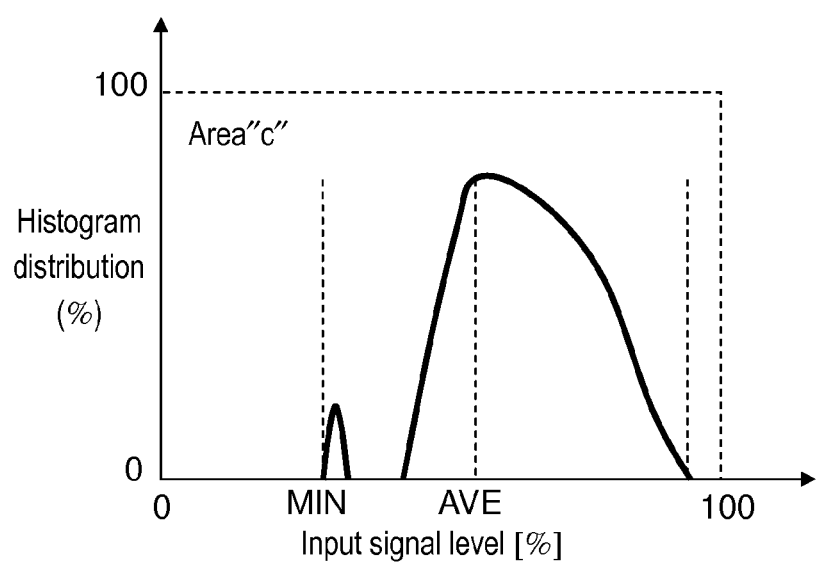
FIG. 10D is a view illustrating an example of a histogram distribution of an output picture, for the area "c"

In this case, the first gain is Yp1, and the second gain is 1.0, as illustrated in FIGS. 10B and 10C. Signal amplitude adjustment part 5 performs the aforementioned calculations, but the pixels with brightness levels lower than the average value AVE are maintained, in brightness level, since the second gain is 1.0. This results in provision of an output picture signal having a histogram distribution with an enhanced contrast for levels higher than the average value AVE, as illustrated in FIG. 10D.

Figure 11A:
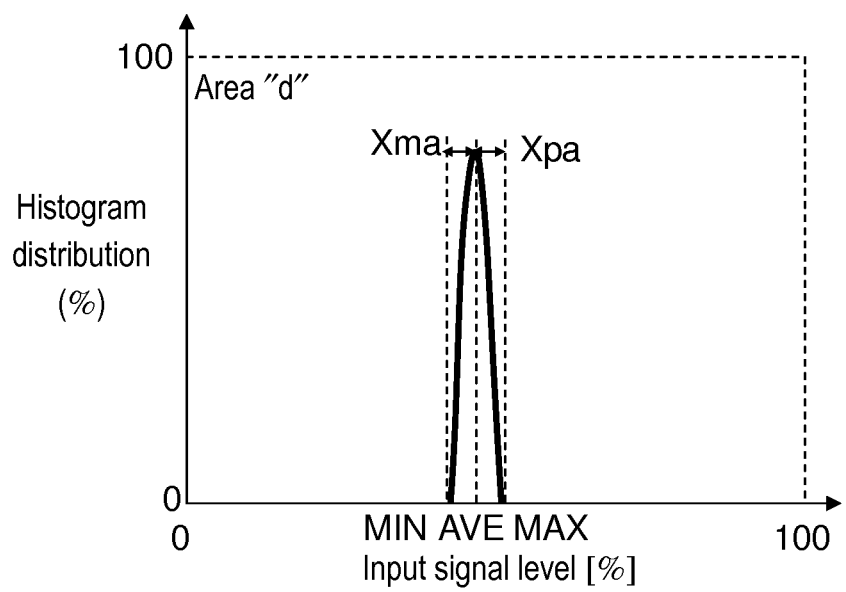
FIG. 11A is a view illustrating an example of a histogram distribution in an area "d", in the same frame in the foggy picture A.
Figure 11B:
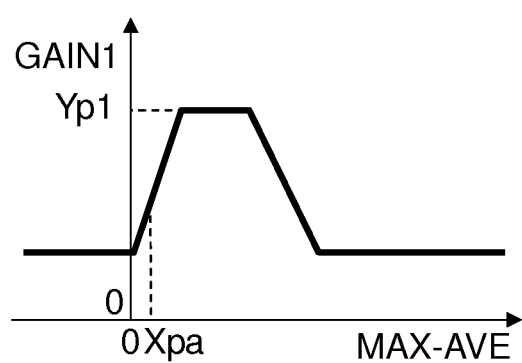
FIG. 11B is a view illustrating an example of a characteristic of the gain GAIN1 which is created by the first gain creating part, for the area "d"
Figure 11C:
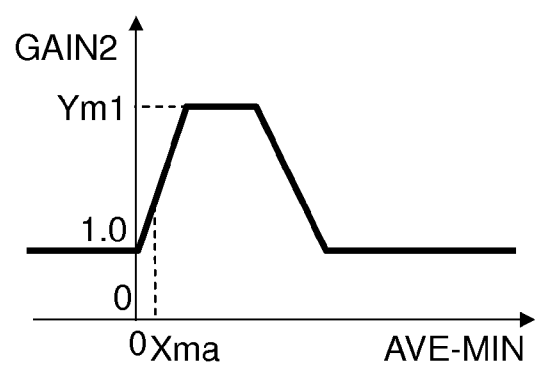
FIG. 11C is a view illustrating an example of a characteristic of the gain GAIN2 which is created by the second gain creating part, for the area "d"
Figure 11D:
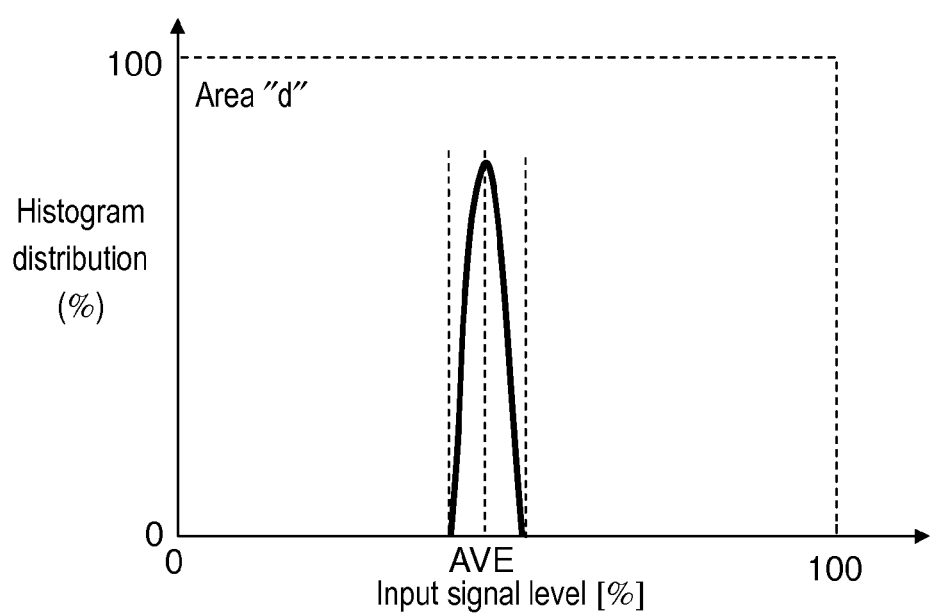
FIG. 11D is a view illustrating an example of a histogram distribution of an output picture, for the area "d"

In the case of the area "d" illustrated in FIG. 11A, the value of the difference MAX−AVE between the maximum value and the average value is Xpa, and the value of the difference AVE−MIN between the minimum value and the average value is Xma, and the Xpa and Xma are both smaller values and, therefore, the first gain GAIN1 and the second gain GAIN2, which are determined from FIGS. 11B and 11C, are both smaller values, similarly. Signal amplitude adjustment part 5 performs the aforementioned calculations, which results in provision of an output picture signal having a histogram distribution having been subjected to suppressed contrast enhancement, as illustrated in FIG. 11D, since the first gain and the second gain are smaller.

The area "d" has such a histogram distribution that the pixels in the area have a uniform brightness level, namely the object has a lower contrast and is uniform, in which variations in the histogram distribution are mainly caused by noise components. Namely, the picture is not required to be subjected to contrast enhancement. With the present technique, it is possible to suppress picture quality degradations due to increases of noise components, since areas of uniform pictures are subjected to suppressed contrast enhancement, as described above.

As described above, the picture processing device according to the present embodiment includes an area-characteristic detector configured to calculate a maximum value, an average value and a minimum value of the signal levels of pixels around a certain pixel to be subjected to the correction in an input picture signal; a first gain creating part configured to calculate a first calculation value for the certain pixel, from the value of the difference between the maximum value and the average value; a second gain creating part configured to calculate a second calculation value for the certain pixel, from the value of the difference between the minimum value and the average value; and a signal amplitude adjustment part, wherein the signal amplitude adjustment part is configured to perform enhancement by multiplying the difference between the average value and the signal level of the certain pixel by the first calculation value to when the signal level of the certain pixel is equal to or higher than the average value and, further, the signal amplitude adjustment part is configured to perform enhancement by multiplying the difference between the average value and the signal level of the certain pixel by the second calculation value when the signal level of the certain pixel is lower than the average value. Namely, the picture processing device according to the present embodiment is structured to calculate the characteristic values (the maximum value, the average value, and the minimum value) for each area in the picture and to perform contrast enhancing processing, independently, on the pixels having signal levels equal to or higher than the average value, and on the pixels having signal levels lower than the average value, according to which of the average value and the brightness level of each pixel is higher.

In this way, it is possible to enhance the contrast of the picture, while preventing excessive enhancement of the contrast. Further, it is possible to prevent degradations of the picture quality due to increases of noise components, in uniform areas with lower contrasts.

Although, in the present embodiment, first gain creating part 3 and second gain creating part 4 have been described as exhibiting conversion characteristics represented by four-part polylines, the present invention is not limited thereto.

Figure 12:
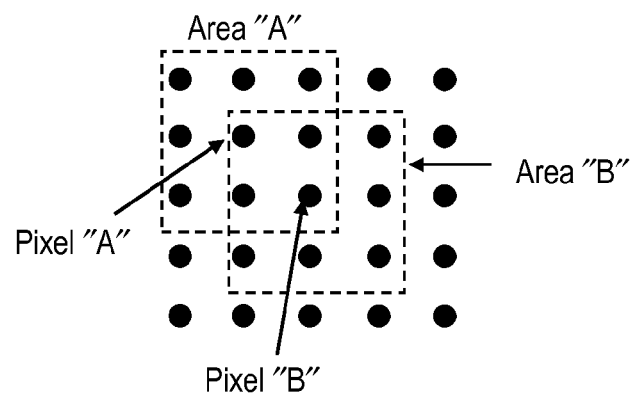
FIG. 12 is an explanation view illustrating an example of a definition of areas, in the picture processing device according to the present embodiment.

Further, although, in the present embodiment, area divisions are performed, the characteristic values (the maximum value, the average value and the minimum value) are calculated therefor, and all the pixels in the areas are subjected to multiplications by the first gain and the second gain, which have the respective same values, it is also possible to define a peripheral area for each pixel, as illustrated in FIG. 12.

FIG. 12 is an explanation view illustrating an example of a definition of areas with 3 horizontal pixels and 3 vertical lines, in the picture processing device according to the present embodiment. As illustrated in FIG. 12, characteristic values of an area A are calculated regarding a pixel A, and characteristic values of an area B are calculated regarding a pixel B.

Figure 13:
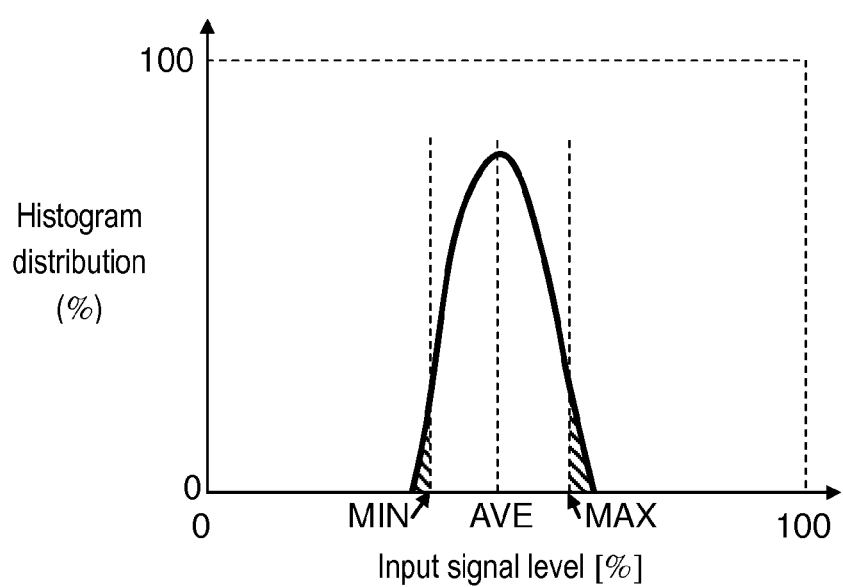
FIG. 13 is an explanation view illustrating an example of definitions of a maximum value and a minimum value, in the picture processing device according to the present embodiment.

FIG. 13 is an explanation view illustrating an example of definitions of a maximum value and a minimum value, in the picture processing device according to the present embodiment. As illustrated in FIG. 13, regarding the maximum value and the minimum value for each area, in consideration of cases where there are pixels with significantly-higher brightness levels which are not related to pictures, due to pixel defects in image pickup devices in cameras, it is also possible to define, as a maximum value, a brightness level lower by a specified number of pixels indicated by oblique lines than the maximum value in the histogram distribution in the area and, similarly, regarding the minimum value, it is possible to define, as a minimum value, a brightness level higher by a specified number of pixels, as illustrated in FIG. 13.

Next, other embodiments of the present technique will be described.

Figure 14:
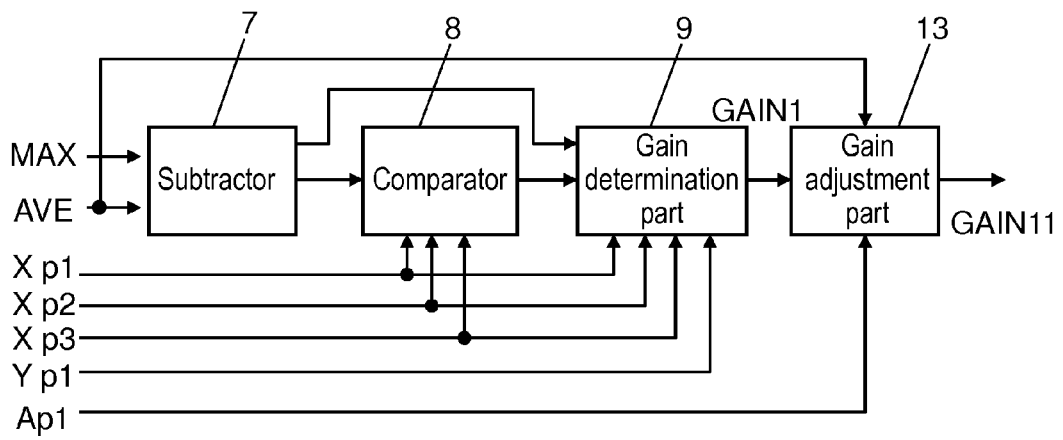
FIG. 14 is a block diagram illustrating an example of the structure of a first gain creating part, in a picture processing device according to another embodiment of the present technique.
Figure 15:
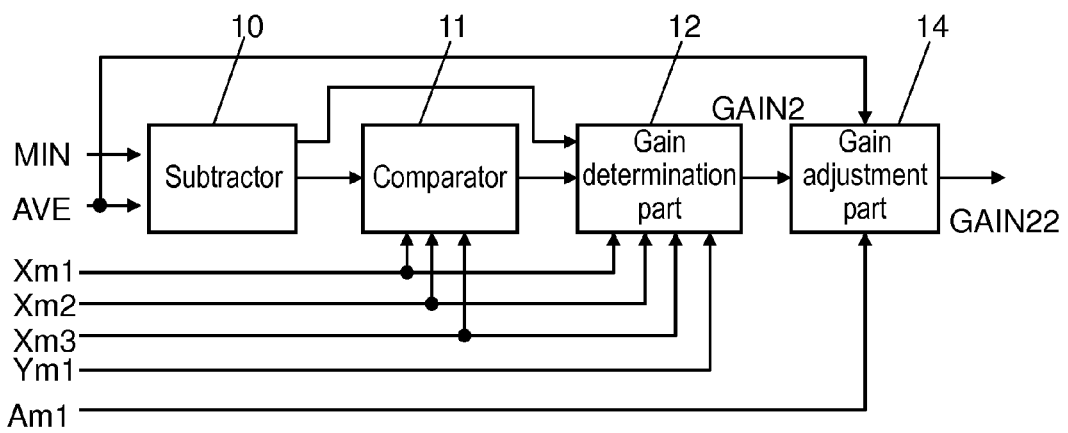
FIG. 15 is a block diagram illustrating an example of the structure of a second gain creating part, in the picture processing device according to the present embodiment.

FIG. 14 is a block diagram illustrating an example of the structure of a first gain creating part, in a picture processing device according to another embodiment of the present technique. FIG. 15 is a block diagram illustrating an example of the structure of a second gain creating part, in the picture processing device according to the present embodiment.

In the present embodiment, as illustrated in FIGS. 14 and 15, gain adjustment parts 13 and 14 are provided, in addition to the structures of first gain creating part 3 and second gain creating part 4. A GAIN1 determined by gain determination part 9 and an average value AVE are inputted to gain adjustment part 13 and, besides, a set parameter Ap1 is inputted thereto, and gain adjustment part 13 outputs a GAIN11. Similarly, a GAIN2 determined by gain determination part 12 and the average value AVE are inputted to gain adjustment part 14 and, besides, a set parameter Am1 is inputted thereto, and gain adjustment part 14 outputs a GAIN22.

Figure 16:
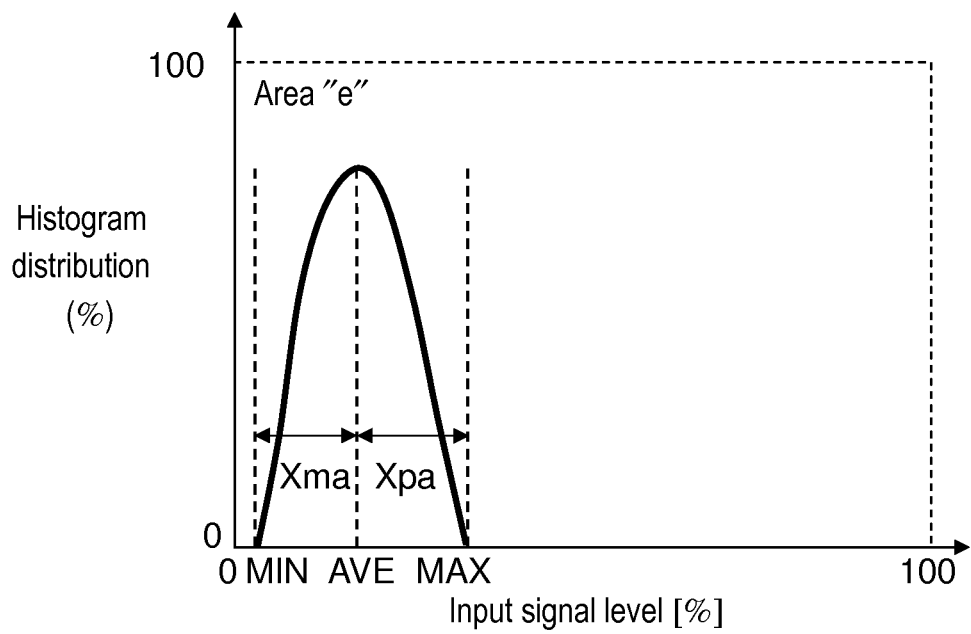
FIG. 16 is a view illustrating a histogram distribution in an area "e", which is a single area in an input picture signal.
Figure 17:
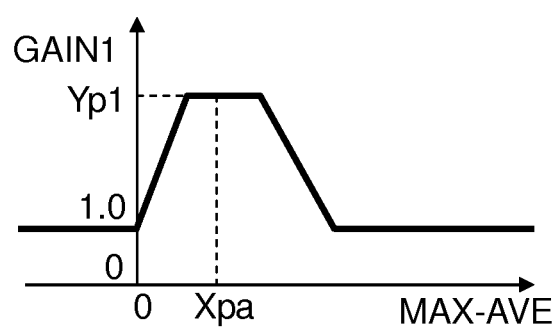
FIG. 17 is a view illustrating an example of a characteristic of a gain GAIN1 which is created by the first gain creating part, for the area "e", in the picture processing device according to the present embodiment.
Figure 18:
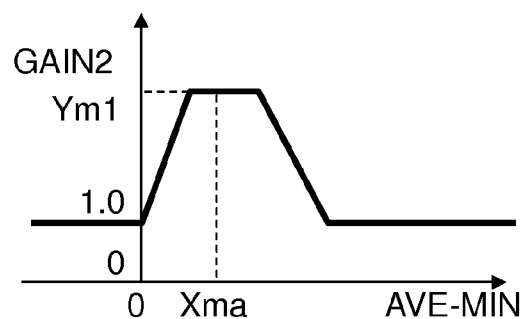
FIG. 18 is a view illustrating an example of a characteristic of a gain GAIN2 which is created by the second gain creating part, for the area "e", in the picture processing device according to the present embodiment.

FIG. 16 is a view illustrating a histogram distribution in an area "e", which is a single area in an input picture signal. Similarly to in the aforementioned embodiment, a first gain GAIN1=Yp1 and a second gain GAIN2=Ym1 are provided, from the value Xpa of the difference between the maximum value and the average value, and from the value Xma of the difference between the average value and the minimum value, as illustrated in FIGS. 17 and 18.

Figure 19:
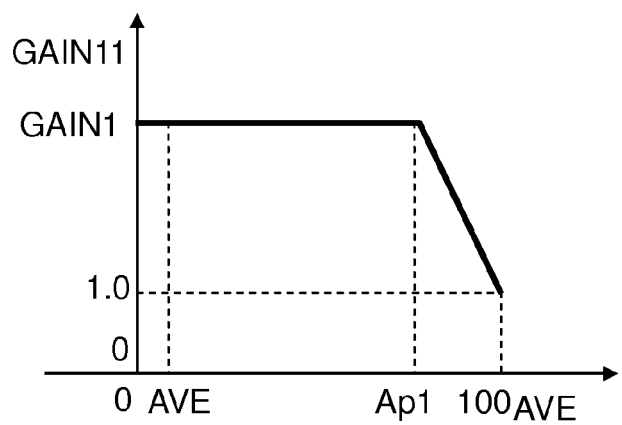
FIG. 19 is a view illustrating an example of a characteristic of a gain GAIN11 which is created by a gain adjustment part, for the area "e", in the picture processing device according to the present embodiment.
Figure 20:
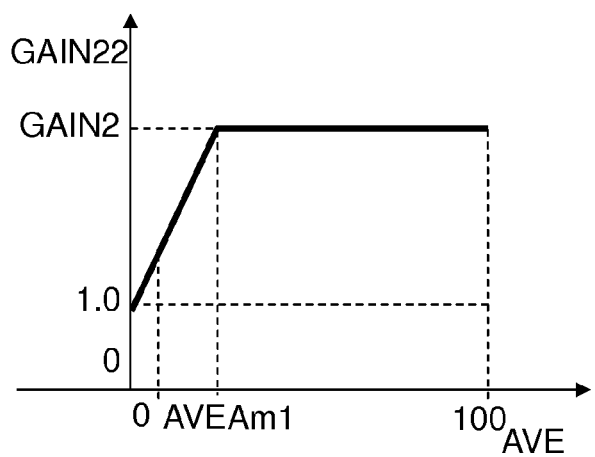
FIG. 20 is a view illustrating an example of a characteristic of a gain GAIN22 which is created by a gain adjustment part, for the area "e", in the picture processing device according to the present embodiment.

Gain adjustment part 13 gradually decreases the first gain GAIN1 when the average value AVE inputted thereto is equal to or more than the set value Ap1 and, further, gain adjustment part 13 converts the decreased first gain GAIN1 such that the output is 1.0 when the average value AVE is 100%, as illustrated in FIG. 19. Further, gain adjustment part 14 gradually decreases the second gain GAIN2 when the average value AVE is equal to or less than Am1 and, further, gain adjustment part 14 converts the decreased second gain GAIN2 such that the output is 1.0 when the average value AVE is 0%, as illustrated in FIG. 20.

In the histogram distribution illustrated in FIG. 16, assuming that the average value is smaller than the set value Am1, GAIN22 outputted from gain adjustment part 14 is decreased to below GAIN2. Further, GAIN11 outputted from gain adjustment part 13 is outputted therefrom while having the same value as GAIN1, without being decreased. GAIN11 and GAIN22 are transmitted to signal amplitude adjustment part 5 which performs, therewith, the same processing as that in the aforementioned embodiment.

Figure 21:
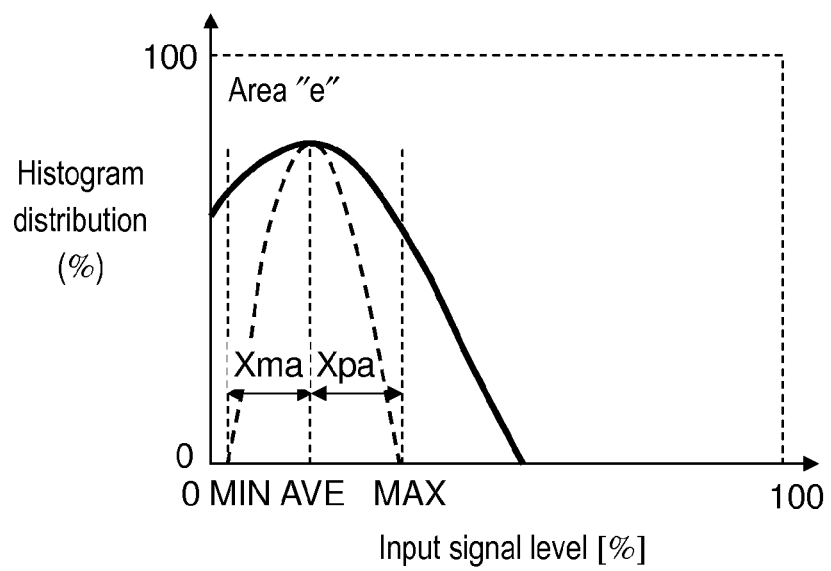
FIG. 21 is a view illustrating an example of a histogram distribution in the area "e", in the picture processing device according to the present embodiment.
Figure 22:
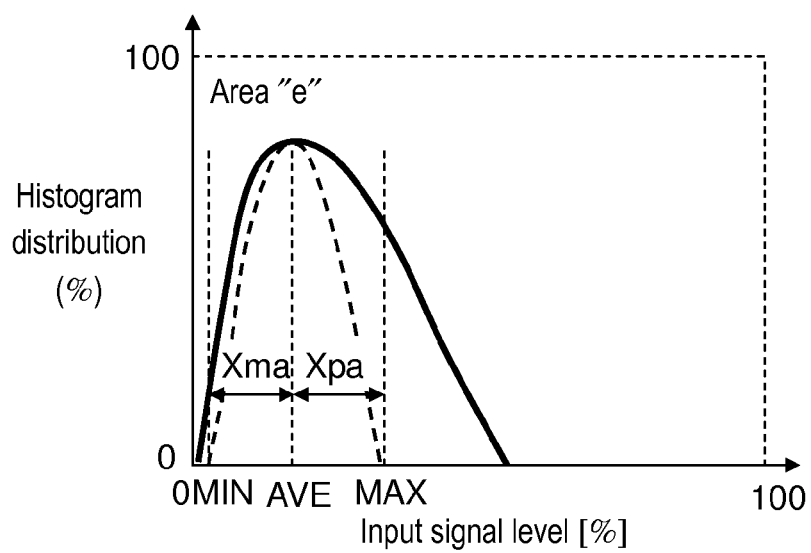
FIG. 22 is a view illustrating an example of a histogram distribution in the area "e", in the picture processing device according to the present embodiment.

There will be described effects provided by the aforementioned operations, with reference to FIGS. 21 and 22. FIGS. 21 and 22 are views illustrating examples of the histogram distribution in the area "e", in the picture processing device according to the present embodiment.

If the first gain GAIN1 and the second gain GAIN2 are employed as such, without being subjected to the aforementioned processing in gain adjustment part 13 and gain adjustment part 14, regarding the histogram distribution illustrated in FIG. 16, the histogram distribution resulted from the conversion is such that some of the pixels with brightness levels lower than the average value are converted into values equal to or less than 0, as indicated by a solid line in FIG. 21. In this case, the levels equal to or less than 0 are outputted while being clipped at zero, which induces blocked up shadows, thereby degrading the picture quality. With the present technique, by decreasing the second gain to GAIN22 to reduce the gain for the pixels with brightness levels lower than the average value, it is possible to prevent clipping, as indicated by a solid line in FIG. 22. Namely, it is possible to attain contrast enhancement, in the state where the occurrence of blocked up shadows is suppressed.

Further, although not illustrated in the figure, it is also possible to suppress the occurrence of blown out highlights, in cases of larger average values, according to the same principle. Further, dotted lines in FIGS. 21 and 22 represent the respective histogram distributions before the conversion.

Further, although, in the present embodiment, the gain adjustment parts exhibit characteristics represented by two-part polylines, which are illustrated in FIGS. 19 and 20, the present invention is not limited thereto.

Figure 23:
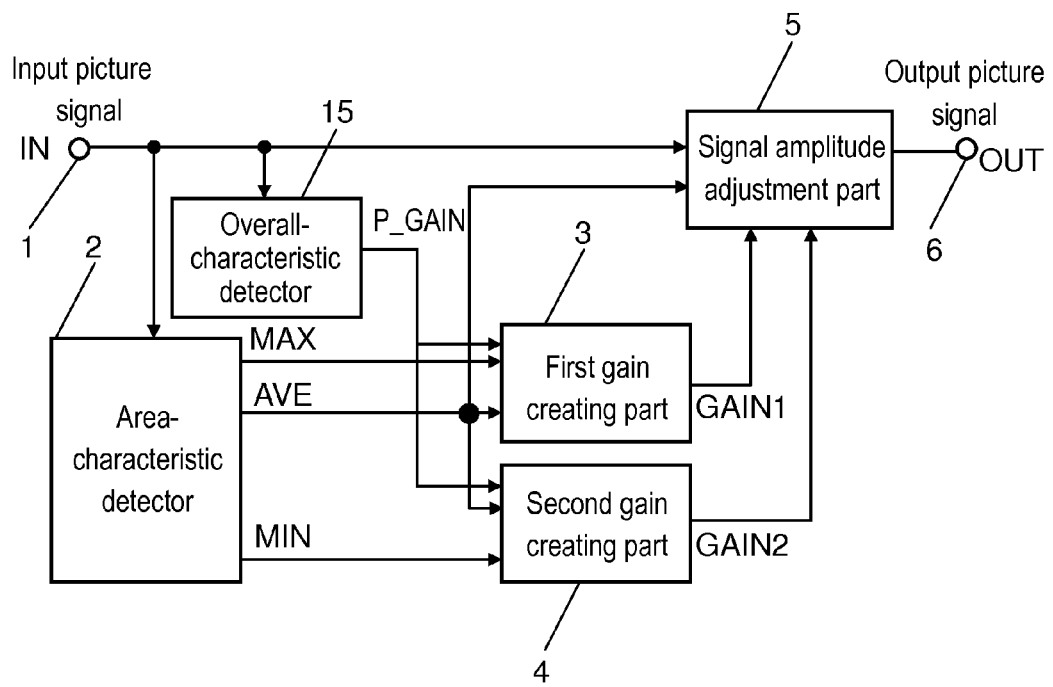
FIG. 23 is a block diagram illustrating an example of a picture processing device according to yet another embodiment of the present technique.

FIG. 23 is a block diagram illustrating an example of a picture processing device according to yet another embodiment of the present technique. As illustrated in FIG. 23, the present embodiment is structured to have overall-characteristic detector 15, in addition to the embodiment illustrated in FIG. 1.

The embodiment illustrated in FIG. 1 has been described, assuming that the parameters Xp1, Xp2, Xp3 and Xm1, Xm2, Xm3 for determining the characteristics of creation of the first gain and the second gain are constant. In the present technique, overall-characteristic detector 15 is configured to determine a parameter gain P-GAIN based on the input picture signal, and further, to supply the parameter gain P-GAIN to first gain creating part 3 and second gain creating part 4.

Thus, in cases of frames having lower contrasts in their entirety, such as in cases of pictures fogged densely in their entirety, it is possible to attain contrast enhancement, with higher efficiency.

Figure 24:
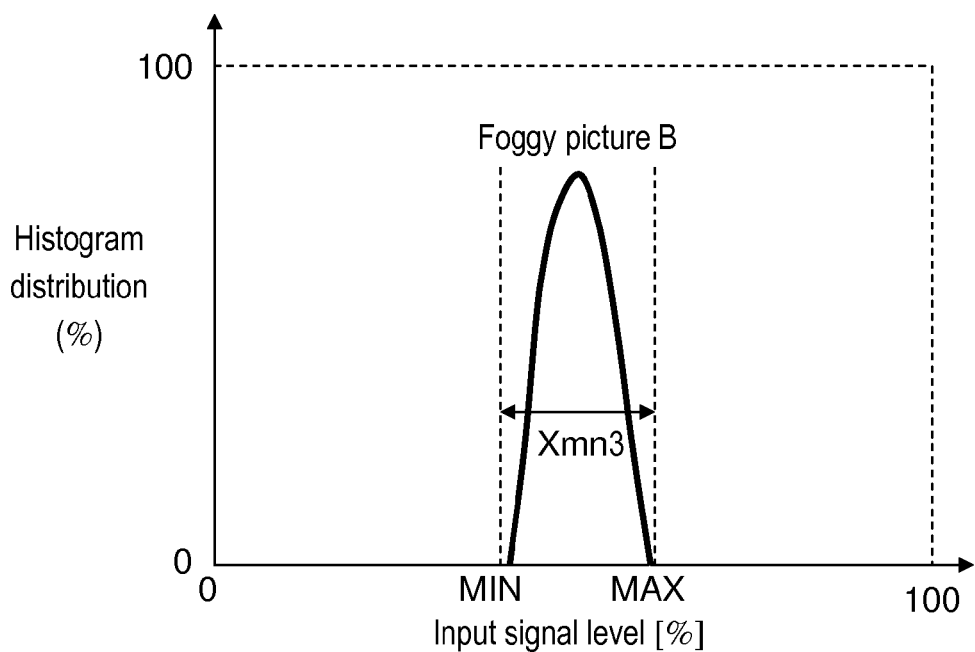
FIG. 24 is a view illustrating an example of a histogram distribution, in a unit field period or a unit frame period, in an input picture signal, in the picture processing device according to the present embodiment.
Figure 25:
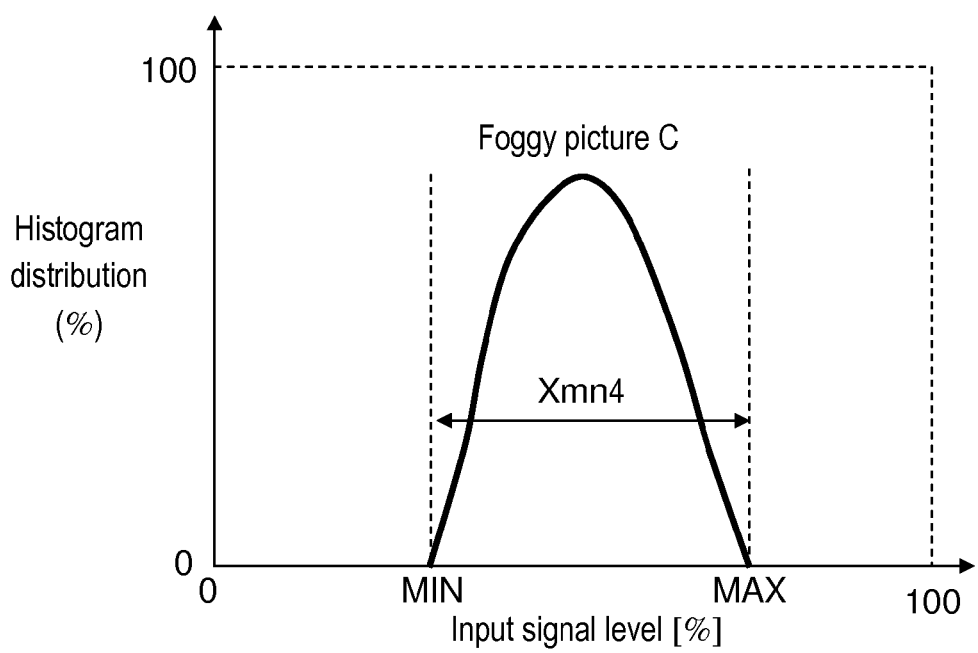
FIG. 25 is a view illustrating an example of a histogram distribution, in a unit field period or a unit frame period, in an input picture signal, in the picture processing device according to the present embodiment.

FIGS. 24 and 25 are views illustrating examples of histogram distributions, in a unit field period or a unit frame period, in input picture signals, in the picture processing device according to the present embodiment. FIG. 24 illustrates a distribution in a foggy picture B in a densely-fogged state, and FIG. 25 illustrates a distribution in a foggy picture C in a sparsely-fogged state.

Overall-characteristic detector 15 is configured to detect a maximum value and a minimum value in a histogram distribution in an unit field period or a unit frame period in an input picture signal, and further, to determine a parameter gain P_GAIN based on these maximum and minimum values.

Figure 26:
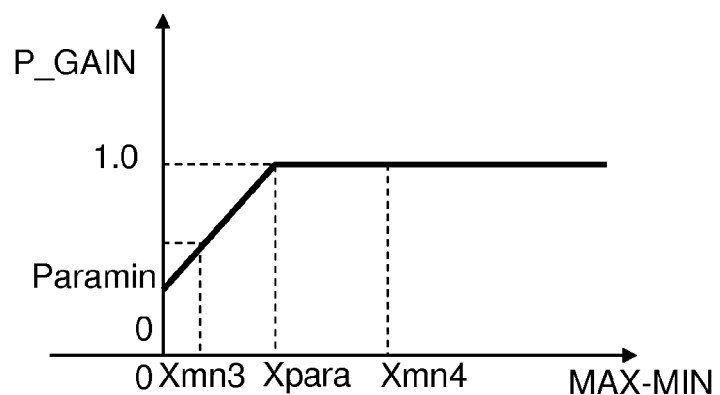
FIG. 26 is a view illustrating an example of a characteristic of determination of a parameter gain P_GAIN by an overall-characteristic detector, in the picture processing device according to the present embodiment.

FIG. 26 is a view illustrating an example of the characteristic of determination of the parameter gain P_GAIN by overall-characteristic detector 15, in the picture processing device according to the present embodiment. Referring to FIG. 26, the horizontal axis represents the value of the difference between the maximum value MAX and the minimum value MIN in a unit field period or a unit frame period, while the vertical axis represents the parameter gain P_GAIN. Referring to FIG. 26, parameters Paramin and Xpara are parameters which are set additionally.

As illustrated in FIG. 26, the characteristic is as follows. That is, when the value of the difference MAX−MIN between the maximum value MAX and the minimum value MIN is equal to or more than Xpara, P_GAIN is 1.0. When the value of the difference therebetween is equal to or less than Xpara, P_GAIN gradually decreases. When the value of the difference MAX−MIN between the maximum value MAX and the minimum value MIN is zero, P_GAIN is Paramin.

In the case of the dense fog illustrated in FIG. 24, the value Xmn3 of the difference between the maximum value and the minimum value is smaller than Xpara, and therefore, P_GAIN is equal to or less than 1.0, as illustrated in FIG. 26. In the case of the damp fog illustrated in FIG. 25, the value Xmn4 of the difference therebetween is larger than Xpara, and therefore, P-GAIN is 1.0, as illustrated in FIG. 26.

As illustrated in FIG. 23, the parameter gain P_GAIN is inputted to first gain creating part 3 and second gain creating part 4 that multiply the inputted parameter gain P_GAIN by respective parameters Xp1, Xp2, Xp3 and Xm1, Xm2 and Xm3 to create respective parameters Xp11, Xp22, Xp33 and Xm11, Xm22 and Xm33 for determining a first gain characteristic and a second gain characteristic.

$$Xp11 = Xp1 \times P\_GAIN$$

$$Xp22 = Xp2 \times P\_GAIN$$

$$Xp33 = Xp3 \times P\_GAIN$$

$$Xm11 = Xm1 \times P\_GAIN$$

$$Xm22 = Xm2 \times P\_GAIN$$

$$Xm33 = Xm3 \times P\_GAIN$$

Figure 27:
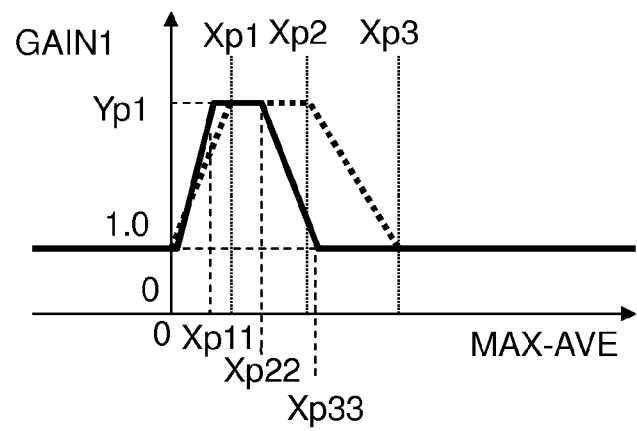
FIG. 27 is a view illustrating an example of a first gain creation characteristic, in the picture processing device according to the present embodiment.
Figure 28:
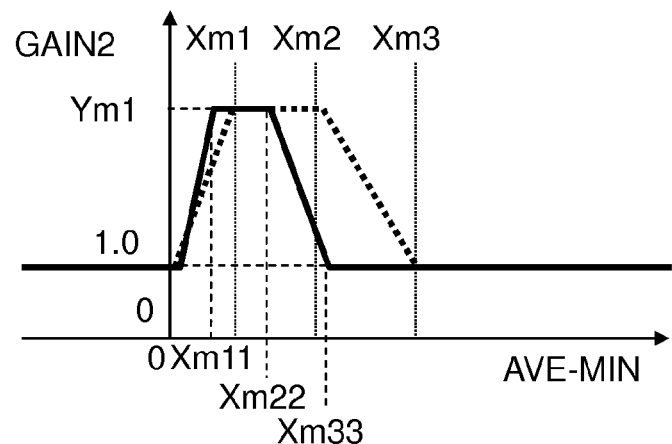
FIG. 28 is a view illustrating an example of a second gain creation characteristic, in the picture processing device according to the present embodiment.

FIG. 27 is a view illustrating an example of a first gain creation characteristic, in the picture processing device according to the present embodiment. FIG. 28 is a view illustrating an example of a second gain creation characteristic, in the picture processing device according to the present embodiment. In FIGS. 27 and 28, dotted lines represent the conversion characteristics in the case of the sparse fog indicated by the histogram distribution in FIG. 25.

In the case of FIG. 25, P_GAIN, which is determined by the difference value Xmn4, is 1.0, and therefore, Xp11, Xp22, Xp33 and Xm11, Xm22 and Xm33 have the same values as those of Xp1, Xp2, Xp3 and Xm1, Xm2 and Xm3. The conversion characteristics determined by the respective parameters are the characteristics represented by the dotted lines in FIGS. 27 and 28.

In the case of the characteristics, it is assumed that the sparse fog illustrated in FIG. 25 is subjected to efficient contrast enhancement. The foggy picture B illustrated in FIG. 24 has a lower contrast than that of a foggy picture C, and therefore, has areas having lower contrasts, similarly. If the conversion is performed thereon with the conversion characteristics represented by the dotted lines, there are a larger number of areas in which the value of the difference MAX−AVE between the maximum value MAX and the average value AVE is equal to or less than Xp1, and the value of the difference AVE−MIN between the minimum value MIN and the average value AVE is equal to or less than Xm1, thereby causing insufficient contrast enhancement.

The present technique is for overcoming this. In the case where the foggy picture B in FIG. 24 is inputted, P_GAIN is less than 1.0, and therefore, the conversion characteristics created by Xp11, Xp22, Xp33 and Xm11, Xm22 and Xm33 are conversion characteristics having respective peaks in lower ranges of the value of the difference MAX−AVE between the maximum value MAX and the average value AVE, and the value of the difference AVE−MIN between the minimum value MIN and the average value AVE, in comparison with the dotted lines. Namely, it is possible to enhance fine contrasts dispersed by dense fogs, thereby enabling effective contrast enhancement depending on contrasts in sparse fogs, dense fogs and the like.

Further, in the present embodiment, first gain creating part 3 and second gain creating part 4 can be made to have the same structures as those in the embodiment illustrated in FIGS. 3 and 5. As a matter of course, they can be also made to have the same structures as those in the embodiment illustrated in FIGS. 14 and 15.

Further, although overall-characteristic detector 15 has been described as exhibiting a characteristic represented by two-part polylines, which is illustrated in FIG. 26, the present invention is not limited thereto.

Further, regarding the maximum value and the minimum value for each area, in consideration of cases where there are pixels with significantly-higher brightness levels which are not related to pictures, due to pixel defects in image pickup devices in cameras, it is also possible to define, as a maximum value, a brightness level lower by a specified number of pixels indicated by oblique lines than the maximum value in the histogram distribution, and similarly, regarding the minimum value, it is possible to define, as a minimum value, a brightness level higher by a specified number of pixels.

Further, in the aforementioned embodiments, as the brightness levels of picture input signals, it is possible to employ any of red, green and blue colors, which are three primary colors of pictures, and, also, it is possible to employ color-difference signals.

As described above, the present technique can be applied widely to processing devices and processing programs for processing picture information.

As described above, embodiments have been described as illustrations of techniques according to the present technique. For attaining this, the accompanying drawings and the detailed descriptions have been given.

Accordingly, the constituents described in the accompanying drawings and the detailed descriptions may include constituents which are unnecessary for overcoming the problem, as well as constituents necessary for overcoming the problem, for the sake of illustration of the aforementioned techniques. Therefore, such unnecessary constituents should not be determined to be necessary, immediately, because these unnecessary constituents are described in the accompanying drawings and the detailed descriptions.

Further, the aforementioned embodiments are merely for illustration of the techniques according to the present technique, and therefore, various types of changes, substitutions, additions, eliminations and like can be made to the claims and equivalents thereto.

What is claimed is:

1. A picture processing device comprising:
an area-characteristic detector configured to calculate a maximum value, an average value, and a minimum value of signal levels of pixels around a certain pixel to be subjected to a correction in an input picture signal;
a first gain creating part configured to calculate a first calculation value for the certain pixel, from a value of difference between the maximum value and the average value;
a second gain creating part configured to calculate a second calculation value for the certain pixel, from a value of difference between the minimum value and the average value; and
a signal amplitude adjustment part configured;
to perform enhancement by multiplying the difference between the average value and the signal level of the certain pixel by the first calculation value when the signal level of the certain pixel is equal to or higher than the average value, and
to perform enhancement by multiplying the difference between the average value and the signal level of the certain pixel by the second calculation value when the signal level of the certain pixel is lower than the average value.

2. The picture processing device according to claim 1, wherein
the first calculation value has a property of being maximized when the value of the difference between the maximum value and the average value is any value other than a maximum and a minimum, and
the second calculation value has a property of being maximized when the value of the difference between the minimum value and the average value is any value other than a maximum and a minimum.

3. The picture processing device according to claim 1, wherein the first gain creating part is configured to multiply the first calculation value by a value having a property of being dependent on the average value and being larger when the average value is minimized than when the average value is maximized, so as to define a product of the multiplication as the first calculation value.

4. The picture processing device according to claim 1, wherein the second gain creating part is configured to multiply the second calculation value by a value having a property of being dependent on the average value and being larger when the average value is maximized than when the average value is minimized, so as to define a product of the multiplication as the second calculation value.

5. The picture processing device according to claim 1, further comprising:
an overall-characteristic detector configured to detect an overall maximum value and an overall minimum value of a picture, in a unit frame period or a unit field period;

wherein the value of the difference between the average value and the maximum value which is maximized in the first gain creating part, and the value of the difference between the average value and the minimum value which is maximized in the second gain creating part are varied depending on a value of difference between the overall maximum value and the overall minimum value.

6. The picture processing device according to claim 5, wherein
the first calculation value has a property of being maximized when the value of the difference between the maximum value and the average value is any value other than a maximum and a minimum, and
the second calculation value has a property of being maximized when the value of the difference between the minimum value and the average value is any value other than a maximum and a minimum.

7. The picture processing device according to claim 5, wherein
the first gain creating part is configured to multiply the first calculation value by a value having a property of being dependent on the average value and being larger when the average value is minimized than when the average value is maximized, so as to define a product of the multiplication as the first calculation value.

8. The picture processing device according to claim 5, wherein
the second gain creating part is configured to multiply the second calculation value by a value having a property of being dependent on the average value and being larger when the average value is maximized than when the average value is minimized, so as to define a product of the multiplication as the second calculation value.

* * * * *